(12) United States Patent
Hwang

(10) Patent No.: US 8,861,901 B2
(45) Date of Patent: Oct. 14, 2014

(54) IMPACT SENSOR OF ACTIVE HOOD SYSTEM

(71) Applicants: Hyundai Motor Company, Seoul (KR); Kia Motors Corporation, Seoul (KR)

(72) Inventor: In Hwang, Hwaseong-si (KR)

(73) Assignees: Hyundai Motor Company, Seocho-Gu, Seoul (KR); Kia Motors Corporation, Seocho-Gu, Seoul (KR)

( * ) Notice: Subject to any disclaimer, the term of this patent is extended or adjusted under 35 U.S.C. 154(b) by 0 days.

(21) Appl. No.: 13/889,180

(22) Filed: May 7, 2013

(65) Prior Publication Data

US 2014/0050438 A1   Feb. 20, 2014

(30) Foreign Application Priority Data

Aug. 16, 2012  (KR) .................. 10-2012-0089501

(51) Int. Cl.
| | | |
|---|---|---|
| *G02B 6/00* | (2006.01) | |
| *B60R 21/0134* | (2006.01) | |
| *B60R 21/00* | (2006.01) | |
| *B62D 23/00* | (2006.01) | |
| *G01D 5/353* | (2006.01) | |
| *B60R 19/48* | (2006.01) | |
| *B60R 21/0136* | (2006.01) | |
| *B60R 21/38* | (2011.01) | |

(52) U.S. Cl.
CPC ........ *G01D 5/35303* (2013.01); *G01D 5/35345* (2013.01); *B60R 21/38* (2013.01); *B60R 19/48* (2013.01); *B60R 21/0136* (2013.01)
USPC ............ 385/13; 385/147; 180/274; 296/37.1; 293/109; 701/45

(58) Field of Classification Search
USPC ........... 385/13, 14, 15, 16, 88, 129, 125, 137, 385/147; 701/45; 296/37.1; 293/109; 180/271
See application file for complete search history.

(56) References Cited

U.S. PATENT DOCUMENTS

| 5,364,158 | A  | * | 11/1994 | Watanabe et al. ......... 296/187.09 |
| 8,083,270 | B2 | * | 12/2011 | Hwang ......................... 292/128 |
| 8,485,592 | B2 | * | 7/2013  | Shin et al. ................. 296/203.02 |

(Continued)

FOREIGN PATENT DOCUMENTS

| JP | 2008-007064 A | 1/2008 |
| KR | 10-2010-0016982 A | 2/2010 |
| KR | 10-2012-0051136 A | 5/2012 |
| KR | 10-1155390 B1 | 6/2012 |

*Primary Examiner* — Akm Enayet Ullah
(74) *Attorney, Agent, or Firm* — McDermott Will & Emery LLP

(57) ABSTRACT

An impact sensor of an active hood system includes a rear member, optical fiber sensors, a front member and membrane switch. Each of the optical fiber sensors is disposed on upper and lower portions of a front of the rear member and senses an impact force delivered from a bumper at the time of a crash with a pedestrian. The front member is disposed at the front of the rear member and has a protrusion part pressing the optical fiber sensors by the impact force delivered from the bumper at the time of the crash with the pedestrian. The membrane switch is disposed between the front member and the optical fiber sensor, divided into a plurality of regions from a left of the front member to a right thereof, and configured to sense a region which is pressed when the pedestrian crashes with the region.

3 Claims, 6 Drawing Sheets

(56) References Cited

U.S. PATENT DOCUMENTS

| | | | |
|---|---|---|---|
| 8,490,736 B2 * | 7/2013 | Hwang | 180/274 |
| 8,584,787 B2 * | 11/2013 | Hwang | 180/274 |
| 2005/0121925 A1 * | 6/2005 | Federspiel et al. | 293/109 |
| 2013/0088034 A1 * | 4/2013 | Cha et al. | 296/37.1 |
| 2013/0184940 A1 * | 7/2013 | Stoll et al. | 701/45 |
| 2014/0132404 A1 * | 5/2014 | Katoh et al. | 340/436 |
| 2014/0151990 A1 * | 6/2014 | Kim et al. | 280/762 |

\* cited by examiner

IMPACT SENSOR OF ACTIVE HOOD SYSTEM

CROSS-REFERENCE TO RELATED APPLICATION

This application is based on and claims benefit of priority to Korean Patent Application No. 10-2012-0089501, filed on Aug. 16, 2012 in the Korean Intellectual Property Office, the entire contents of which are hereby incorporated by reference.

TECHNICAL FIELD

The present inventive concept relates to an impact sensor of an active hood system, and more particularly, to an impact sensor of an active hood system preventing a secondary crash between the head of a pedestrian and an engine component in a hood by sensing a crash and raising the hood at the time of the crash with the pedestrian.

BACKGROUND

In general, an active hood system raises a hood at the time of a crash between a pedestrian and a vehicle to prevent a secondary crash between the head of the pedestrian and an engine component in a hood, thereby decreasing damage to the head of the pedestrian.

The above-mentioned active hood system includes a sensing sensor included between an energy absorber and a back beam of a bumper of the vehicle, where the sensing sensor outputs a signal while being pressed by an impact delivered to the energy absorber of the bumper at the time of the crash of the pedestrian with the vehicle and the signal is transferred to a controlling part to raise the hood (not shown) in a upward direction, such that an impact force is absorbed when the head of the pedestrian crashes with the hood.

However, since the sensing sensor of the above-mentioned active hood system is mounted on a part of a front of the vehicle, the active hood system does not operate when the pedestrian crashes with parts of the front of the vehicle on which the sensing sensor is not mounted.

SUMMARY

Accordingly, the present inventive concept has been made to solve the above-mentioned problems occurring in the prior art while advantages achieved by the prior art are maintained intact.

An aspect of the present inventive concept relates to an impact sensor of an active hood system capable of more stably protecting a pedestrian by sensing whether the pedestrian or an object crashes with a vehicle and by sensing that the pedestrian crashes with which part of the vehicle when the pedestrian crashes with the vehicle.

One aspect of the present inventive concept encompasses an impact sensor of an active hood system disposed between an energy absorber and a back beam disposed in a bumper to sense an impact force at the time of a crash with a pedestrian. The impact sensor includes a rear member, optical fiber sensors, a front member and a membrane switch. The rear member is disposed at a front of the back beam. The optical fiber sensors are each disposed on upper and lower portions of a front of the rear member and configured to sense an impact force delivered from the bumper at the time of a crash with the pedestrian. The front member is disposed at the front of the rear member and has a protrusion part configured to press the optical fiber sensors by the impact force delivered from the bumper at the time of the crash with the pedestrian. The membrane switch is disposed between the front member and the optical fiber sensor, divided into a plurality of regions from a left of the front member to a right thereof, and configured to sense, as a crashing position of the pedestrian, a region which is pressed when the pedestrian crashes with the region.

The rear member and the front member may be disposed to be connected from a left of the back beam to a right thereof.

The optical fiber sensor may include a light emitting element disposed on the upper portion of the front of the rear member and configured to emit light while being pressed at the time of the crash with the pedestrian, and a light receiving element disposed on the lower portion of the front of the rear member and configured to absorb the light emitted from the light emitting element to convert the light into electrical energy.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
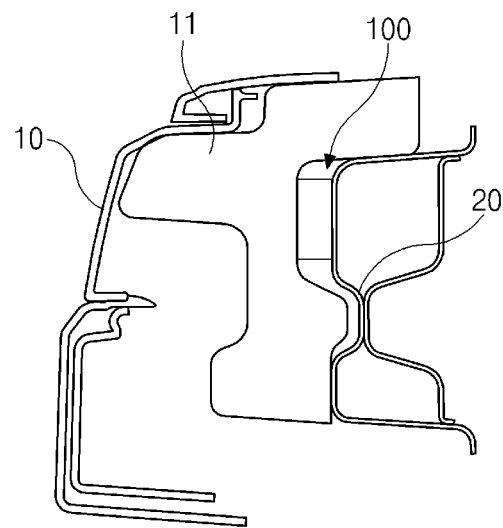
FIG. 1 is a view showing that an impact sensor of an active hood system according to an exemplary embodiment of the present inventive concept is mounted.

Hereinafter, exemplary embodiments of the present inventive concept will be described in detail with reference to the accompanying drawings so that they can be easily practiced by those skilled in the art to which the present inventive concept pertains. However, the present inventive concept may be modified in various different ways and is not limited to the embodiments provided in the description of the present inventive concept. In the accompanying drawings, portions unrelated to the description will be omitted in order to obviously describe the present inventive concept, and similar reference numerals will be used to describe similar portions throughout the disclosure of the present inventive concept.

An impact sensor of an active hood system according to an exemplary embodiment of the present inventive concept may have a configuration for distinguishing whether a pedestrian or an object crashes with a vehicle using an optical fiber sensor and a membrane switch and precisely sensing a crash position when the pedestrian crashes with the vehicle. The impact sensor may operate the active hood system in order to minimize an impact force of the pedestrian based on information sensed from the impact sensor according to an exemplary embodiment of the present inventive concept.

Figure 2:
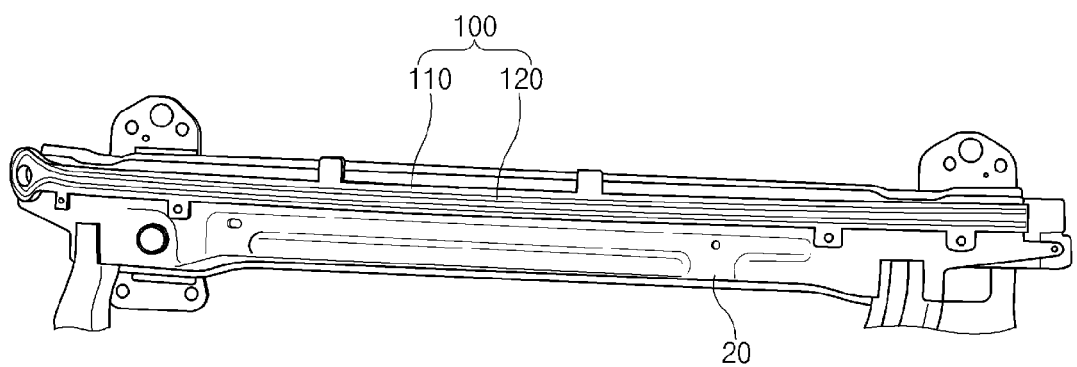
FIG. 2 is a front view showing an impact sensor of an active hood system according to an exemplary embodiment of the present inventive concept.
Figure 3:
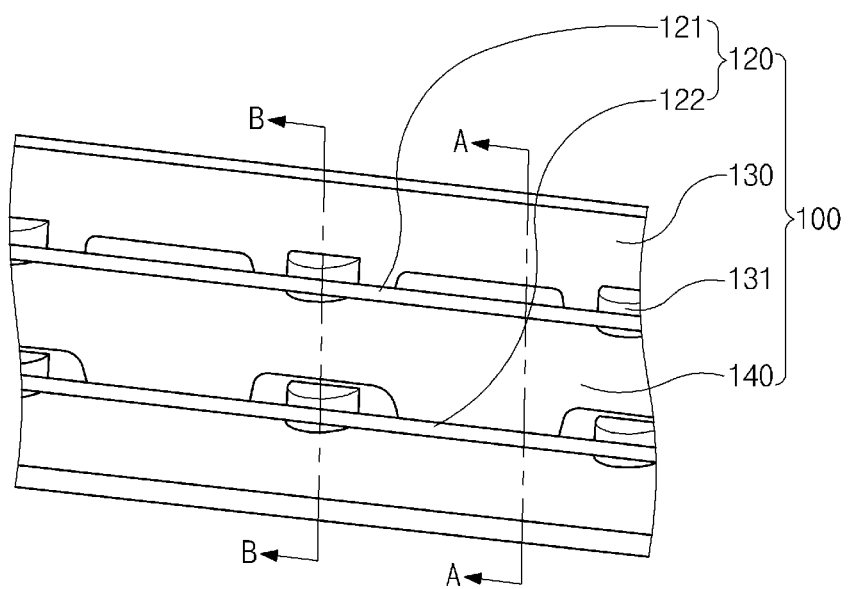
FIG. 3 is a partially enlarged view of FIG. 2.

Referring to FIG. 1, the impact sensor 100 of the active hood system according to an exemplary embodiment of the present inventive concept may be disposed between an energy absorber 11 and a back beam 20 disposed in a bumper 10 to sense an impact force at the time of a crash with the pedestrian. The impact sensor 100 may include a rear member 110, an optical fiber sensor 120, a front member 130, and a membrane switch 140, as shown in FIGS. 1 to 3.

The rear member 110 may be disposed so as to be connected from a left end of a front of the back beam 20 to a right end thereof and may have the optical fiber sensor 120 disposed at a front thereof.

That is, the rear member 110 may be horizontally formed to be long in a band type to thereby stably equip the entire back beam 20 with the optical fiber sensor 120.

Here, upper and lower portions of a front of the rear member 110 may be provided with insertion grooves 111 (see FIG. 4) into which the optical fiber sensor 120 is inserted and the optical fiber sensor 120 is simply equipped along the insertion groove 111.

Figure 4:
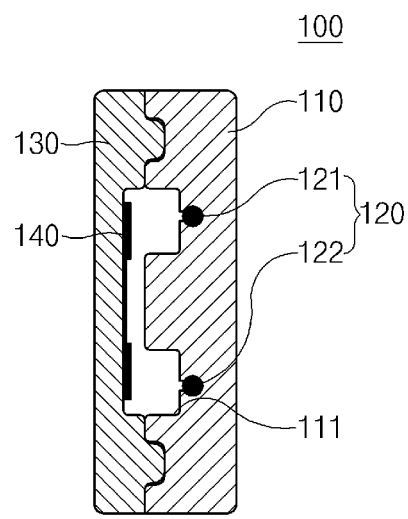
FIG. 4 is a cross-sectional view taken along line A-A of FIG. 3.

As shown in FIGS. 3 and 4, the optical fiber sensors 120 which are to sense whether the pedestrian or the object crashes with the vehicle, may be disposed on the upper and lower portions of the front of the rear member 110, respectively to sense an impact force delivered from the bumper 10 at the time of the crash with the pedestrian.

That is, the optical fiber sensor 120 may include optical fibers disposed on the upper and lower portions of the front of the rear member 110, a light emitting element 121 disposed at the optical fiber positioned on the upper portion of the front of the rear member 110 and emitting light while being pressed at the time of the crash with the pedestrian, and a light receiving element 122 disposed at the optical fiber positioned on the lower portion of the front of the rear member 110 and absorbing the light emitted from the light emitting element 121 to convert the light into electrical energy.

The above-mentioned optical fiber sensor 120 may be pressed while the bumper 10 is pushed at the time of the crash with the pedestrian. At this time, the light emitting element 121 may emit the light and the light receiving element 122 may absorb the light emitted from the light emitting element 121 to convert the light into the electrical energy. Here, while the optical fiber is pressed, the amount of light delivered to the light receiving element 122 through the light emitting element 121 may be decreased, an electrical amount that the light receiving element 122 converts into the electrical energy may be decreased by the decreased amount of light, and whether or not the crash occurs may be sensed based on the decreased electrical amount.

Therefore, when the pedestrian crashes with the bumper 10, the optical fiber sensor 120 is may be greatly pressed and the amount of light delivered to the light receiving element 122 through the light emitting element 121 may be greatly decreased. Therefore, if the electrical energy converted through the light receiving element 122 becomes lower than a set value, the active hood system may determine that the pedestrian has crashed with the bumper 10 based on the electrical energy delivered to be lower than the set value.

Meanwhile, when the object crashes with the bumper 10, a pressed amount of the optical fiber sensor 120 may become smaller and the amount of light delivered to the light receiving element 122 through the light emitting element 121 may be greatly increased. Therefore, if the electrical energy converted through the light receiving element 122 becomes higher than the set value, the active hood system may determine that the object has crashed with the bumper 10 based on the electrical energy delivered to be higher than the set value.

Figure 6:
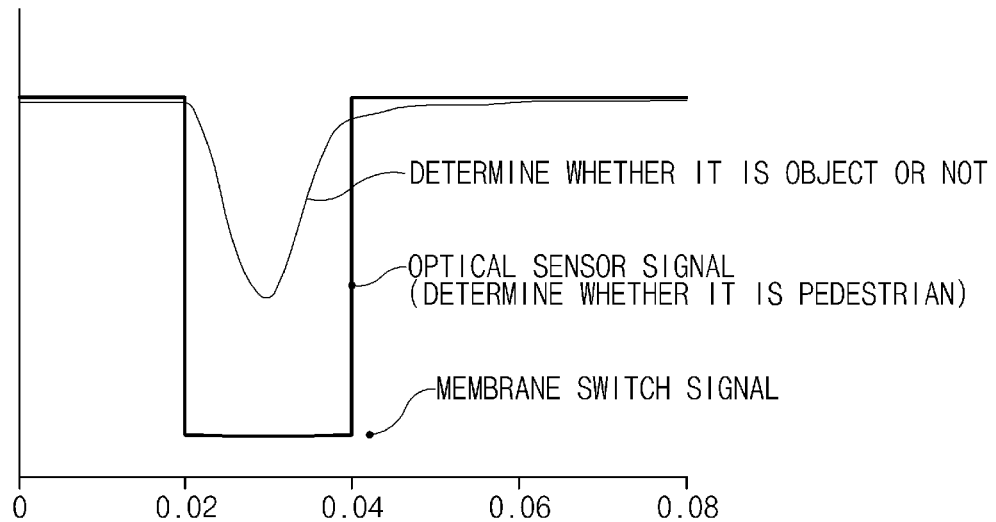
FIG. 6 is a chart indicating a signal output by an impact sensor of a active hood system according to an exemplary embodiment of the present inventive concept.

As describe above, the optical fiber sensor 120 may determine whether the pedestrian or the object crashes with the vehicle by the light emitting element 121 and the light receiving element 122, as shown in a graph in FIG. 6.

Figure 5:
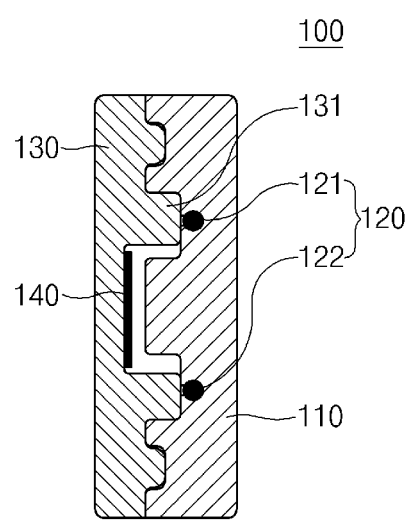
FIG. 5 is a cross-sectional view taken along line B-B of FIG. 3.

As shown in FIGS. 4 and 5, the front member 130 may be disposed at the front of the rear member 110, protect the optical fiber sensor 120 so as not to be damaged from the bumper 10, deliver the impact force delivered from the bumper 10 as it is, and form a protrusion part 131 for pressing the light emitting element 121 and the light receiving element 122 of the optical fiber sensor 120.

Figure 7:
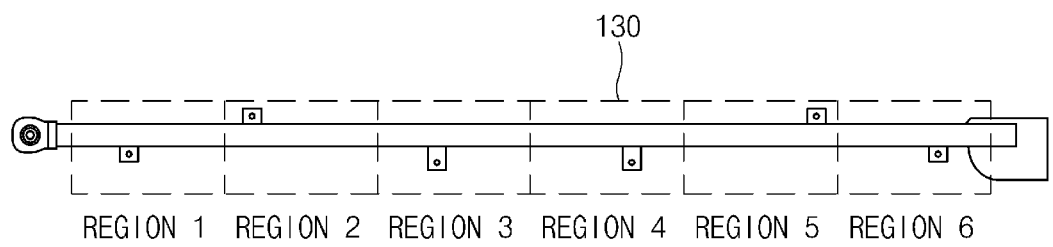
FIG. 7 shows a membrane switch divided into a plurality regions in order to check a position of a pedestrian crashing with a bumper.

As shown in FIG. 7, the membrane switch 140 which is to check a position of the pedestrian crashing with the bumper 10, may be disposed between the front member 130 and the optical fiber sensor 120. The membrane switch 140 may be divided into a plurality of regions from a left of the front member 130 to a right thereof, and sense, as a crashing position of the pedestrian, a region which is pressed when the pedestrian crashes with the region.

According to an embodiment of the present inventive concept, as shown in FIG. 7, the membrane switch 140 may be separately formed from a region 1 up to a region 6 in a horizontal direction from the left to the right. In this case, when the pedestrian crashes with any one region of the regions 1 to 6, the membrane switch 140 of the corresponding region may be pressed and the crashing position of the pedestrian may be sensed, such that the crashing position of the pedestrian is transferred to the active hood system.

That is, an impact value when the pedestrian crashes with the center of the bumper and an impact value when the pedestrian crashes with the ends of the bumper are different from each other. Therefore, through the sensing of the crashing position of the pedestrian by the membrane switch 140, the hood may be raised as a method for further minimizing damage to the pedestrian by the active hood system.

Therefore, the impact sensor of the active hood system according to an exemplary embodiment of the present inventive concept may operate the active hood system by distinguishing whether the pedestrian or the object crashes with the vehicle and also checking the position of the vehicle with which the pedestrian crashes, thereby making it possible to configure a control logic further minimizing damage to the pedestrian.

According to an exemplary embodiment of the present inventive concept, the impact sensor may include an optical fiber sensor and a membrane switch, such that the pedestrian or the object is separately sensed and a position with which the pedestrian crashes is precisely sensed and transferred to the active hood system, thereby making it possible to decrease damage to the pedestrian.

It should be interpreted that the scope of the present inventive concept is defined by the following claims rather than the above-mentioned detailed description and all modifications or alterations deduced from the meaning, the scope, and equivalences of the claims are included in the scope of the present inventive concept.

What is claimed is:

1. An impact sensor of an active hood system disposed between an energy absorber and a back beam disposed in a bumper to sense an impact force at the time of a crash with a pedestrian, the impact sensor comprising:
a rear member disposed at a front of the back beam;
optical fiber sensors each disposed on upper and lower portions of a front of the rear member and configured to sense an impact force delivered from the bumper at the time of the crash with the pedestrian;

a front member disposed at the front of the rear member and having a protrusion part configured to press the optical fiber sensors by the impact force delivered from the bumper at the time of the crash with the pedestrian; and a membrane switch disposed between the front member and the optical fiber sensor, divided into a plurality of regions from a left of the front member to a right thereof, and configured to sense, as a crashing position of the pedestrian, a region which is pressed when the pedestrian crashes with the region.

2. The impact sensor according to claim 1, wherein the rear member and the front member are disposed to be connected from a left of the back beam to a right thereof.

3. The impact sensor according to claim 1, wherein the optical fiber sensor includes:

a light emitting element disposed on the upper portion of the front of the rear member and configured to emit light while being pressed at the time of the crash with the pedestrian, and a light receiving element disposed on the lower portion of the front of the rear member and configured to absorb the light emitted from the light emitting element to convert the light into electrical energy.

\* \* \* \* \*